United States Patent [19]
Kress et al.

[11] Patent Number: 5,810,506
[45] Date of Patent: Sep. 22, 1998

[54] DEVICE FOR COUPLING TOOL PARTS

[75] Inventors: Dieter Kress, Aalen; Friedrich Haberle, Lauchheim, both of Germany

[73] Assignee: Mapal Fabrik fur Prazisionswerkzeuge Dr. Kress KG, Aalen, Germany

[21] Appl. No.: 683,597

[22] Filed: Jul. 15, 1996

[30] Foreign Application Priority Data

Jul. 14, 1995 [DE] Germany .................. 195 25 463.5

[51] Int. Cl.⁶ .................................................. F16B 3/00
[52] U.S. Cl. ........................... 403/14; 403/357; 403/373
[58] Field of Search ................................. 403/356, 359, 403/13, 14, 355, 357, 327, 328, DIG. 6, 326, 373

[56] References Cited

U.S. PATENT DOCUMENTS

| | | |
|---|---|---|
| 2,089,168 | 8/1937 | Brown . |
| 2,397,905 | 4/1946 | Acton et al. .................. 403/359 X |
| 2,650,317 | 8/1953 | Maclay et al. ............... 403/356 X |
| 2,699,338 | 1/1955 | Rue et al. ..................... 403/356 X |
| 3,011,794 | 12/1961 | Vaughn ......................... 403/359 X |
| 3,222,884 | 12/1965 | Lyle ................................ 403/356 |
| 3,487,903 | 1/1970 | Stickan ......................... 403/356 X |
| 3,525,271 | 8/1970 | Raines ........................... 403/356 X |
| 3,832,076 | 8/1974 | Gehrke ............................ 403/359 |
| 3,865,499 | 2/1975 | Flichy ........................... 403/359 X |
| 4,283,158 | 8/1981 | Takahata ...................... 403/359 X |
| 4,437,782 | 3/1984 | Geisthoff .................... 403/359 X |

FOREIGN PATENT DOCUMENTS

| | | |
|---|---|---|
| 0341321 A2 | 11/1989 | European Pat. Off. . |
| 2652393 | 3/1991 | France ........................... 403/356 |
| 135438 | 11/1902 | Germany ........................ 403/356 |
| 3292417 | 12/1991 | Japan .............................. 403/356 |

*Primary Examiner*—Harry C. Kim
*Attorney, Agent, or Firm*—Ostrolenk, Faber, Gerb & Soffen, LLP

[57] ABSTRACT

A connecting device or coupling between two coupled tool parts including a first tool part (3) which has a driver (5) and a second tool part (7) which has a groove (9) includes a connecting place or location (1) which is characterized by the fact that it includes a device (15) which compels a well-defined angle-of-rotation position or orientation between the first tool part and the second tool part.

14 Claims, 4 Drawing Sheets

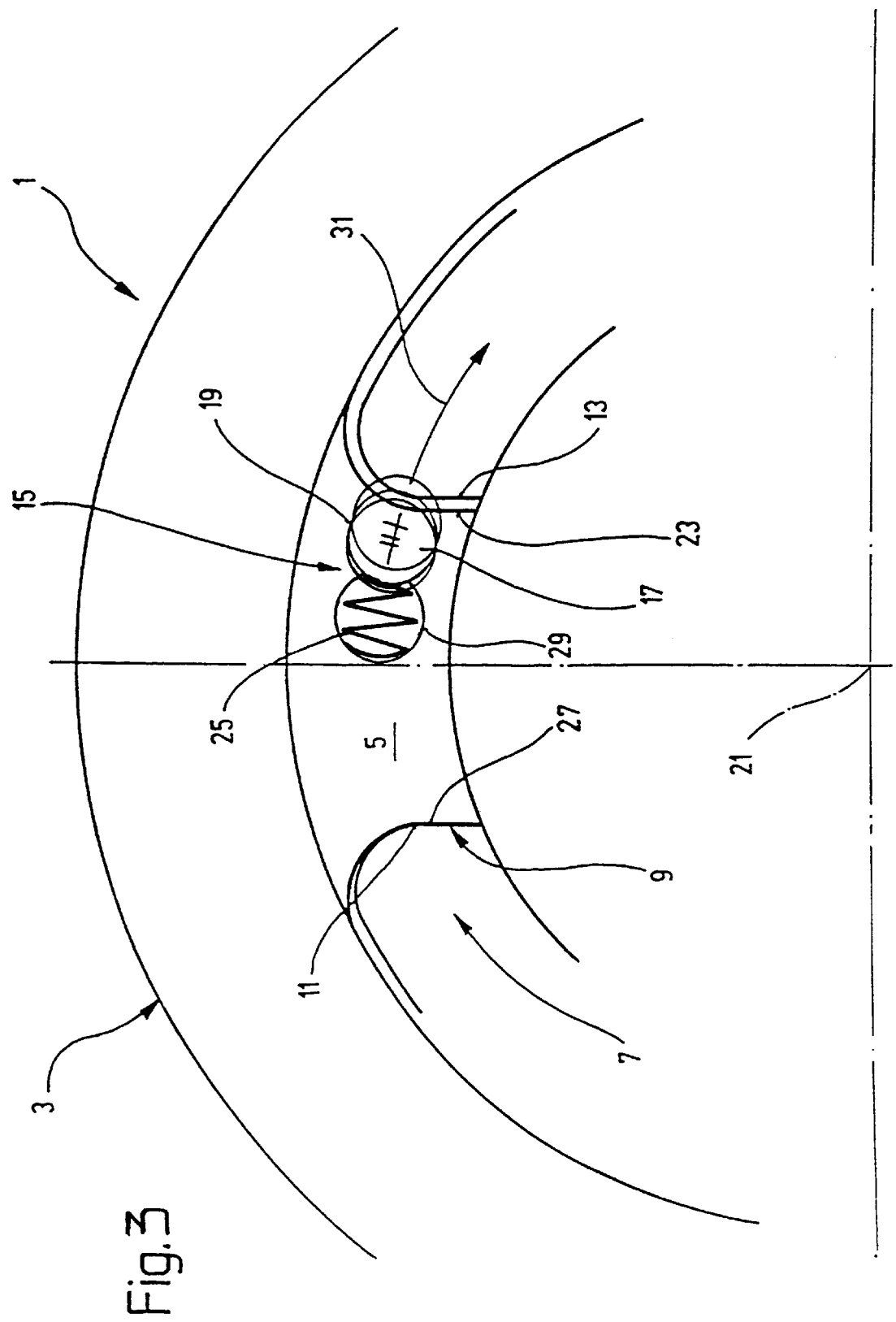

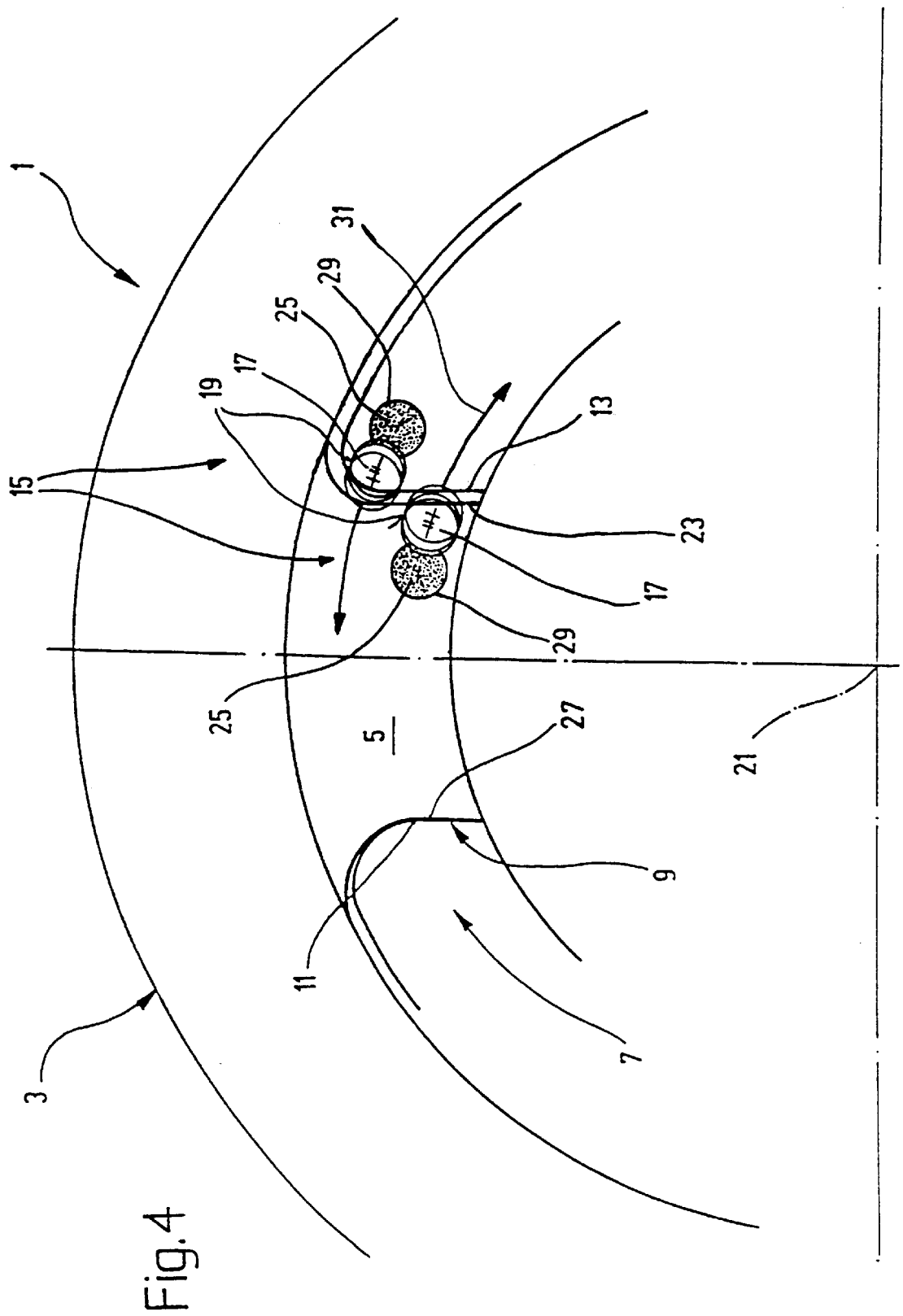

DEVICE FOR COUPLING TOOL PARTS

BACKGROUND OF THE INVENTION

The present invention relates to tools and, more particularly, to a coupling between adjacent tool parts including a driving tool part and a driven tool part.

The tool part coupling includes a connecting place or location which can be both a place of detachment and an interface, for example the connection between a machine spindle and the tool arranged thereon, or the connection between two parts of a tool, for instance a tool head and an adapter or transition piece. The coupling connection of the invention also covers two or more adapters located between the two tool parts.

One essential attribute of the invention is that it concerns a connection or coupling between two tool parts which transmits a required torque from a first tool part which includes a driver that engages a groove provided in the second tool part. For easier handling of the tool parts, it is necessary and customary to provide a certain play between the driver and the groove. This means that relative turning movement between the two tool parts produces a certain slack, or imprecise angular alignment between the tool parts. This is disadvantageous when the connecting place is associated with ordinary tools and/or machine tools in which a precisely aligned cutting edge is required, for instance, in lathes.

SUMMARY OF THE INVENTION

Accordingly, it is an object of the present invention to provide a connecting location between tools by which exact angular alignment of the tool parts is made possible.

The foregoing and other objects of the invention are achieved by means of a tool connection which precisely and rigidly fixes the angular orientation of the tool parts. Due to the fact that the connecting place is provided with a device which forces the tool parts to assume a well-defined relative angular position, exact alignment of the tool parts is assured upon the assembly thereof. The coupling hardware at the connecting place of the two tool parts operates such that when the tools are turned with respect to each other a side flank of the groove of one tool comes to rest against a limiting edge of the driving portion of the other tool part. Thus, a stop is provided at the point of transmission of the torque at the connecting place. If the parts are now firmly clamped to each other, the angular position which has been established is retained.

In a preferred embodiment, the device which sets the angular position of the parts has a setting member which is preferably a pin, which can be fabricated inexpensively.

Other features and advantages of the present invention will become apparent from the following description of the invention which refers to the accompanying drawings.

BRIEF DESCRIPTION OF THE DRAWING

The invention will be explained in further detail below with reference to the drawing, in which:

FIG. 3 is a further embodiment of the coupling, which shows the resilient element formed as a spring.

FIG. 4 is a further embodiment of the coupling, showing the pin being provided both in the driver and in the driven part.

DETAILED DESCRIPTION OF THE INVENTION

Figure 1:
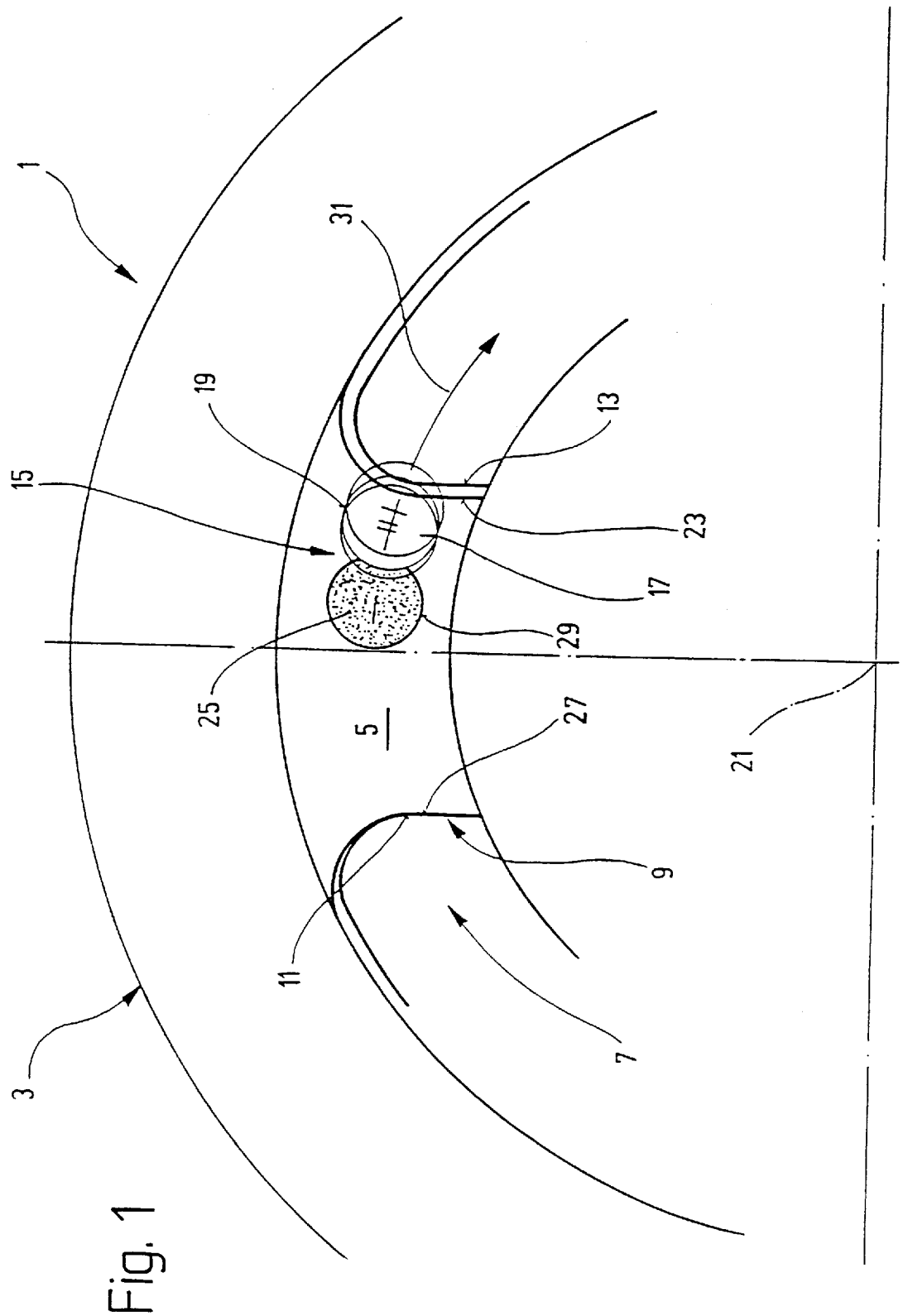
FIG. 1 is a sketch of a portion of the tools, illustrating the connection coupling between the tool parts.
Figure 2:
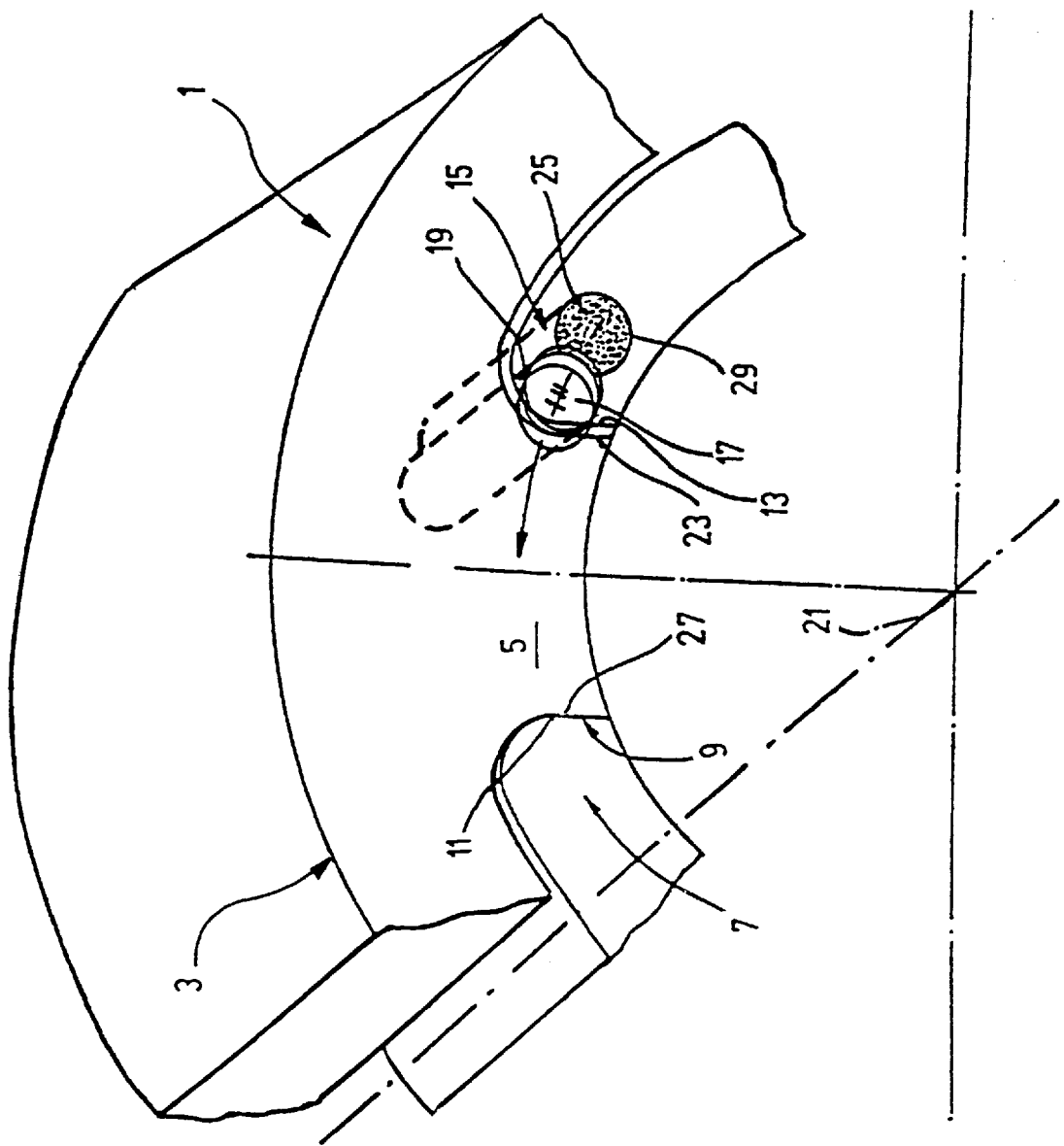
FIG. 2 is a schematic representation in perspective view of a further embodiment of the tool connection showing the manner in which the setting member is arranged on the second tool part.

The basic sketch of FIG. 1 shows a connecting place or location 1 between two tool parts, namely between a first tool part 3 which has a driver 5 and a second tool part 7 which receives the driver 5. The driver comes to rest between the two side flanks 11 and 13 of a groove 9 of the tool part 7. The lateral limiting surfaces of the driver 5 extend substantially parallel to the side flanks 11 and 12. The width of the driver is somewhat shorter than the corresponding width of the groove 9.

The present invention provides the connecting location with a location registration facility 15 which forces the two tool parts to assume a well-defined, i.e., exact, angular orientation between the first tool part 3 and the second tool part 7. The facility 15 has a setting member in the form of a pin 17 which is arranged in a recess or hole 19. The hole 19 extends parallel to the axis of rotation 21 of the tool parts 3 and 7, i.e. perpendicularly to the plane of FIG. 1. The distance of the hole 19 from the lateral limiting surface 23 of the driver 5 is selected so that the hole intersects the lateral limiting surface 23, whereby a slot which extends perpendicularly to the plane of the figure is formed.

The long side of the pin 17 extends through the slot, perpendicularly to the plane of the figure. The slot emerges and thus protrudes over the lateral limiting surface 23 which, in turn, extends perpendicularly to the plane of the figure and thus substantially parallel to the long side of the pin 17.

The slot is so narrow that the pin 17 cannot fall out and so that it is held dependably in the hole 19. The distance from the center of the hole 19 to the lateral limiting surface 23 is somewhat less than the radius of the hole, so that the slot is formed in the limiting surface 23.

The lateral limiting surface 23 forms with the side flank 13 the contact surface between the driver 5 and the groove 9.

The pin 17 is acted upon by a resilient element 25, producing a clamping or adjustment force which acts in the clockwise direction, so that the pin protrudes beyond the lateral limiting surface 23 and is pressed against the side flank 13 of the groove 9. The adjustment force thus compels a specific position, i.e. angle of rotation, of the first part 3 with respect to the second part 7 at the connecting place 1. The driver 5 is forced by the adjustment force of the facility or device 15 with its left lateral limiting surface 27 which lies opposite the limiting surface 23 against the side flank 11 of the groove 9. The two metallic surfaces of the first and second tool parts 3 and 7 form a defined stop which serves to transmit even large torques. The coupling connection of the parts is such that assurance is had by means of the stop that no relative rotation of the two parts of the connecting place 1 can take place.

The resilient element 25 can be made of any desired resilient material, for instance of plastic or any elastic material. It is also conceivable to arrange a spring element in the hole 29 extending perpendicularly to the plane of the figure which receives the resilient element 25, the spring element acting on the pin 17 with a setting force acting in clockwise direction, as indicated by arrow 31.

It is also possible for the setting member to be formed as a ball which cooperates with the resilient element 25, for instance a spring element. Such a spring element can preferably be a so-called heavy clamping pin which consists, for instance, of a resilient spring metal that is formed as a tubular body with a longitudinal slit.

Naturally, the device 15 can also be arranged adjacent the left side limiting surface 27. It is also conceivable to arrange the device 15 in the region of the side flank 11 or the side flank 13 of the groove 9.

Finally, it is also possible to provide two devices 15, which act against each other. The invention encompasses the concept of activating in each case only one of devices based, for example, on the operational direction-of-rotation of the tool parts.

The device 15 is preferably so arranged and developed that upon a transmission of a torque from the first tool part 3 to the second tool part 7, no devices 15 are present in the contact surface between the driver 5 and groove 9 which result in a specific position of angle of rotation. This means, therefore, that the two flanks of groove and driver which lie in the contact surface and transmit the torque are intact.

Of course, it is possible to provide more than one driver and one groove. In this case, the number of devices 15 which effect the alignment or orientation of the parts can be less than the number of drivers/grooves. Drivers and grooves which do not have such devices serve exclusively for transmitting torque between the two parts of the tool. Thus, several devices 15 can be provided, all preferably acting in the same direction.

In operation, the device 15 of FIG. 1 builds up an adjustment force which allows relative rotation of the two tool parts 3 and 7 until a well-defined stop is reached, which is formed here by the lateral limiting surface of the driver and the side flank of the groove which receives the driver. The adjustment force has a component of force acting in the tangential direction relative to the axis of rotation 21. This component of force causes the relative rotation of the two parts 1 and 7 with respect to each other.

From the embodiment shown in FIG. 1, it may be noted that as a result of the ability of the device to produce a well-defined angle-of-rotation position, precise alignment of the two tool parts at the place of connection is established by the location of the driver against a side surface of the groove. If, for instance, the second part 7 is a tool holder, an exact alignment of a knife plate which is held by the tool holder can be established. This is of extreme importance, particularly in the case of lathes.

The tool parts associated with the place of connection are firmly clamped to each other when they have assumed the well-defined angular position.

It is also clear that the principle of establishing a well-defined angular position between tool parts is not limited to the hollow-shaft clamping approach shown in the figure. It is also possible, in the case of a conical shaft clamping, to provide a device which produces a well-defined angular position between the two clamped parts. The device can also be provided with a connecting place of any desired shape in a region shape in a region of a driver and a corresponding groove which are provided for the transmission of a torque which is to be active over the connecting place.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A tool connection between two adjacent tool parts, including a first tool part having a driver and a second tool part having a groove which receives the driver, the driver being rotatable to rotate the second tool part around an axis of rotation, the tool connection including a device for forcing the driver at the first tool part to assume a well-defined, precise angular orientation relative to the second part;

the device has a setting member which can be acted on by a force produced by a resilient element, to act on one of the first and second tool parts to cause relative rotational movement between the tool parts in order to establish said well-defined angular orientation;

the device is formed to cause the driver of the first part to press against a side flank of the groove of the second part, the side flank extends substantially in a radial direction relative to the axis of rotation, whereby the side flank acts as a stop;

the setting member bearing against the side flank and the resilient element producing a force on the setting member which acts substantially entirely in a tangential direction relative to said axis of rotation.

2. The tool connection according to claim 1, in which the setting member is a pin.

3. The tool connection according to claim 2, in which the resilient element is a spring.

4. The tool connection according to claim 2, in which the pin is arranged substantially parallel to a lateral limiting surface of the driver.

5. The tool connection according to claim 1, in which the pin is arranged substantially parallel to a lateral limiting surface of said side flank of the groove.

6. The tool connection according to claim 5, in which the pin has an end surface which is curved.

7. The tool connection according to claim 5, in which the pin has an end surface which is spherically curved.

8. The tool connection according to claim 2, in which the pin is arranged in a hole having a center that extends substantially parallel to said side flank and which is at a distance from a lateral limiting surface or side surface which is less than the radius of the hole.

9. The tool connection according to claim 2, in which the pin is arranged in a hole which extends at an angle in the range of greater than 0° and to about 90° to a lateral limiting surface or side surface of the hole and the pin rests against the side surface or lateral limiting surface.

10. The tool connection according to claim 2, in which the pin is arranged in the driver.

11. The tool connection according to claim 2, in which the pin is arranged in the second tool part.

12. The tool connection according to claim 2, in which the pin is mounted to the driver and another pin is mounted to the second tool part.

13. The tool connection according to claim 1, in which the setting member is a ball.

14. A tool connection between two adjacent tool parts, including a first tool part having a driver and a second tool part having a groove which receives the driver, wherein the connection includes at least one integrated device in one or both of said tool parts to assume a well-defined precise angular orientation between the first part and the second part, in which the device has a setting member which is formed to cause a force produced by a resilient element, which acts on one of the driver and the second tool part to cause relative rotational movement for setting the well-defined angular orientation between the first part and the second part and is formed in such a way as to cause the driver of the first part to press against a side flank of the groove of the second part, whereby the flank acts as a stop.

* * * * *